United States Patent
Barnett et al.

(10) Patent No.: US 10,830,560 B2
(45) Date of Patent: Nov. 10, 2020

(54) FIREARM SIGHT ASSEMBLY

(71) Applicant: KNS Precision, Inc., Fredericksburg, TX (US)

(72) Inventors: Thomas Clauis Barnett, Kerrville, TX (US); Christian Kager Welch, Fredericksburg, TX (US); Daniel Earl Fisher, Fredericksburg, TX (US); Nicholas Adam Rode, Hunt, TX (US); Todd Alan Magee, Farmington, UT (US); Steven Michael Pappas, Marion, UT (US)

(73) Assignee: KNS PRECISION, INC., Fredericksburg, TX (US)

( * ) Notice: Subject to any disclaimer, the term of this patent is extended or adjusted under 35 U.S.C. 154(b) by 0 days.

(21) Appl. No.: 16/224,942

(22) Filed: Dec. 19, 2018

(65) Prior Publication Data

US 2019/0186870 A1    Jun. 20, 2019

Related U.S. Application Data

(60) Provisional application No. 62/626,681, filed on Feb. 5, 2018, provisional application No. 62/607,965, filed on Dec. 20, 2017.

(51) Int. Cl.
*F41G 1/06* (2006.01)
*G02B 7/24* (2006.01)
(Continued)

(52) U.S. Cl.
CPC .............. *F41G 1/06* (2013.01); *F41G 1/01* (2013.01); *F41G 1/033* (2013.01); *F41G 1/10* (2013.01);
(Continued)

(58) Field of Classification Search
CPC ..... F41G 1/16; F41G 1/17; F41G 1/06; F41G 1/033; F41G 1/10; F41G 1/01
See application file for complete search history.

(56) References Cited

U.S. PATENT DOCUMENTS

| 301,628 | A | * | 7/1884 | Rabbeth | F41G 1/17 42/140 |
| 426,887 | A | * | 4/1890 | West | F41G 1/17 42/140 |

(Continued)

FOREIGN PATENT DOCUMENTS

| DE | 202017101203 U1 | * | 6/2018 | F41G 1/10 |
| FR | 360076 A | * | 4/1906 | F41G 1/26 |
| FR | 386759 A | * | 6/1908 | F41G 1/17 |

*Primary Examiner* — Joshua T Semick
(74) *Attorney, Agent, or Firm* — Bennet K. Langlotz; Langlotz Patent & Trademark Works, LLC

(57) ABSTRACT

A firearm sight assembly comprises a rear base. The firearm sight assembly comprises a rear sight element movable with respect to the rear base between a lowered condition and an elevated condition. The rear sight element has a first pair of upwardly projecting first rear posts defining a first notch therebetween when in the lowered condition. The rear sight element has a second pair of upwardly projecting second rear posts defining a second notch therebetween when in the elevated condition. The first rear posts extend to a first height above the rear base, and the second rear posts extend to a second height above the rear base. The second height is greater than the first height.

29 Claims, 11 Drawing Sheets

(51) Int. Cl.
*F41G 1/16* (2006.01)
*F41G 1/01* (2006.01)
*F41G 1/10* (2006.01)
*F41G 1/033* (2006.01)
*F41G 1/30* (2006.01)

(52) U.S. Cl.
CPC ............. *F41G 1/16* (2013.01); *G02B 7/24* (2013.01); *F41G 1/30* (2013.01)

(56) References Cited

U.S. PATENT DOCUMENTS

| | | | | |
|---|---|---|---|---|
| 1,292,211 | A * | 1/1919 | Young | F41G 1/17 42/140 |
| 3,281,941 | A * | 11/1966 | Oblack | F41G 1/17 42/136 |
| 4,993,158 | A * | 2/1991 | Santiago | F41G 1/32 42/135 |
| 5,467,552 | A * | 11/1995 | Cupp | F41G 1/26 42/125 |
| 7,181,882 | B2 * | 2/2007 | Woodbury | F41G 1/033 42/137 |
| 9,322,615 | B2 * | 4/2016 | Raybman | F41G 1/17 |
| 9,423,212 | B2 * | 8/2016 | Campean | F41G 1/18 |
| 9,683,811 | B1 * | 6/2017 | Warensford | F41G 1/16 |
| 9,869,526 | B1 * | 1/2018 | Cheng | F41G 1/17 |
| 10,337,837 | B2 * | 7/2019 | Keller | F41G 11/007 |
| 2007/0234625 | A1 * | 10/2007 | Kidd | F41G 1/02 42/111 |
| 2008/0092424 | A1 * | 4/2008 | Keng | F41G 1/18 42/137 |

* cited by examiner

FIREARM SIGHT ASSEMBLY

CROSS-REFERENCE TO RELATED APPLICATION

This application claims the benefit of U.S. Provisional Application No. 62/607,965, filed 20 Dec. 2017, and U.S. Provisional Application No. 62/626,681, filed 5 Feb. 2018, which are hereby incorporated by reference in their entirety.

FIELD OF THE INVENTION

The present disclosure relates to sights for firearms. More particularly, the present disclosure relates to sights for pistols.

BACKGROUND

Many existing sights (commonly referred to as iron sights) for pistols are adapted for installation on a pistol slide to minimize the height of the sighting line above the centerline of the barrel. Many existing sights for pistols are adapted to be low profile for compatibility with pistol holsters. Many existing pistols are adapted to receive a removable suppressor. However, many existing suppressors block the sighting line of many existing sights for pistols. Existing solutions for use of suppressors with pistols include installation of high profile sights for pistols. Many existing high profile sights for pistols are incompatible with many existing pistol holsters. Many existing high profile sights for pistols may be difficult and/or time consuming to remove each time a suppressor is removed. Many existing high profile sights for pistols may be difficult and/or time consuming to install and sight in each time a suppressor is installed.

Many existing Back Up Iron Sights (BUIS) for rifles are foldable (also referred to as pop-up or flip-up). However, many of these existing folding BUIS for rifles are adapted for co-witness through a rifle scope or rifle-mounted optic. This results in a large height (e.g. more than 1 inch) of the sighting line above the top surface of a rifle. The large height may require substantial mass in a BUIS for rifles. The large height may require substantial width in a base of a BUIS for rifles. Furthermore, many of these existing folding BUIS for rifles are only usable in the deployed (or elevated) condition. In addition, many of these existing folding BIAS for rifles are adapted to be mounted to non-reciprocating rifle specific features such as accessory rails, M-LOK slots, KeyMod slots, and the like. However, the G-forces experienced by rifle mounted parts under recoil may be substantially less than the G-forces experienced by reciprocating parts such as pistol slides.

Many existing optical sights are adaptable for use on a pistol slide. Many of these existing optical sights employ electronics and batteries. Since electronics and batteries may become inoperative, many users of optical sights on pistols prefer to install iron sights as well. However, many existing optical sights block the sighting line of many existing sights for pistols. Existing solutions for use of optical sights with pistols include installation of high profile sights for pistols. In addition to the challenges of high profile sights mentioned above, many existing high profile sights for pistols will block part of the viewing window of an optical sight.

What is needed is an improved firearm sight assembly for pistols.

SUMMARY

At least some embodiments of the present disclosure provide a firearm sight assembly. The firearm sight assembly comprises a rear base. The firearm sight assembly comprises a rear sight element movable with respect to the rear base between a lowered condition and an elevated condition. The rear sight element has a first pair of upwardly projecting first rear posts defining a first notch therebetween when in the lowered condition. The rear sight element has a second pair of upwardly projecting second rear posts defining a second notch therebetween when in the elevated condition. The first rear posts extend to a first height above the rear base. The second rear posts extend to a second height above the rear base. The second height is greater than the first height.

The first notch and the second notch may be defined in a single unitary element.

The rear sight element may be pivotally connected to the rear base.

The rear sight element may be configured to pivot one quarter turn between the lowered condition and the elevated condition.

The rear base may include rear base posts having upper base ends. The rear sight element may have upper element ends. The upper base ends may be registered with the upper element ends when the rear sight element is in the lowered condition.

The firearm sight assembly may include a front sight element having a front base. The front sight element may have a single post element connected to the front base and movable between a lowered condition and an elevated condition. The single post element may extend to a first front post height registered with the first rear posts when the single post element and the rear sight element are in the lowered condition. The single post element may extend to a second front post height registered with the second rear posts when the single post element and the rear sight element are in the elevated condition.

The firearm sight assembly may include an intervening optical sight between the rear sight element and the front sight element.

The optical sight may have an aiming point registered with the rear sight element when in the elevated condition.

The firearm sight assembly may include a pistol slide connected to the rear base, to the optical sight, and to the front base.

The optical sight may be a non-magnifying reflex sight having a transparent optical element adapted to reflect the aiming point to a user.

The rear base may include a dovetail.

At least some embodiments of the present disclosure provide a firearm sight assembly. The firearm sight assembly comprises a rear base. The firearm sight assembly comprises a rear sight element movable with respect to the rear base between a lowered condition and an elevated condition. The rear sight element has a pair of upwardly projecting rear posts defining a notch therebetween when in the elevated condition. The rear posts project to a first level when in the elevated condition. The rear sight element has an upper surface projecting to a second level when in the lowered condition. The second level is below the first level. The firearm sight assembly comprises an optical sight forward of the rear sight element. The optical sight has a viewing window defining a field of view. The viewing window has a lower edge at a third level below the first level, such that the rear posts are viewed in registration with the viewing window when in the elevated condition.

The rear sight element may be pivotally connected to the rear base.

The rear sight element may be configured to pivot one quarter turn between the lowered condition and the elevated condition.

The rear base may include rear base posts having upper base ends. The upper base ends may be registered with the upper surface when the rear sight element is in the lowered condition.

The third level may be above the second level such that the rear sight element does not obscure the viewing window when in the lowered condition.

The firearm sight assembly may include a front sight element having a front base. The front sight element may have a single post element connected to the front base. The single post element may be movable between a lowered condition and an elevated condition. The single post element may extend to a first front post height registered with rear posts when the single post element and the rear sight element are in the elevated condition. The single post element may extend to a second front post height registered with the upper surface of the rear sight element when the single post element and the rear sight element are in the lowered condition.

The optical sight may be between the rear sight element and the front sight element.

The optical sight may have an aiming point registered with the rear sight element when in the elevated condition.

The firearm sight assembly may include a pistol slide connected to the rear base, to the optical sight, and to the front base.

The optical sight may be a non-magnifying reflex sight having a transparent optical element adapted to reflect the aiming point to a user.

The front base may include a leg.

DESCRIPTION OF THE CURRENT EMBODIMENTS

Figure 1:
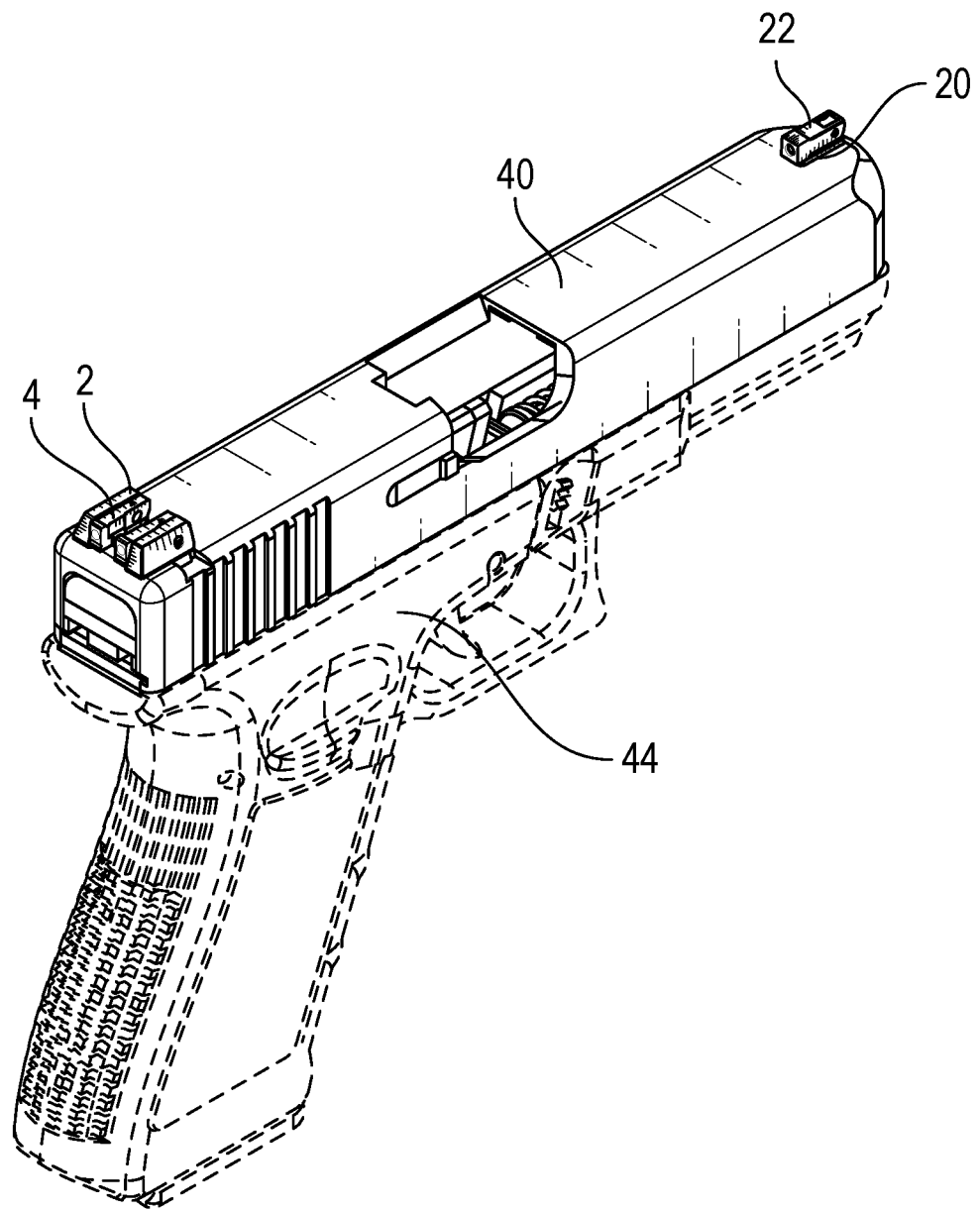
FIG. 1 illustrates an example firearm sight assembly installed on an example pistol slide of an example firearm according to various aspects of an embodiment.

Embodiments of the present disclosure now will be described more fully hereinafter with reference to the accompanying drawings, in which embodiments of the present disclosure are shown. This present disclosure may, however, be embodied in many different forms and should not be construed as limited to the embodiments set forth herein; rather, these embodiments are provided so that this disclosure will be thorough and complete, and will fully convey the scope of the present disclosure.

Certain embodiments of the present disclosure provide a firearm sight assembly. The firearm sight assembly may be adapted for use on pistols. Persons of ordinary skill in the art will recognize that existing BUIS for rifles may not be easily adapted for installation on a pistol. Persons of ordinary skill in the art will recognize that existing BUIS for rifles may not generate a useable sight picture through a reflex sight without a riser or adapter plate under the reflex sight.

According to an embodiment, a firearm sight assembly may comprise a rear base. The firearm sight assembly may comprise a rear sight element. The rear sight element may be connected to the rear base. The rear sight element may be movable with respect to the rear base between a lowered condition and an elevated condition. The rear sight element may have a first pair of upwardly projecting first rear posts. The first pair of upwardly projecting first rear posts may define a first notch therebetween when in the lowered condition. The rear sight element may have a second pair of upwardly projecting second rear posts. The second pair of upwardly projecting second rear posts may define a second notch therebetween when in the elevated condition. The first notch and the second notch may be defined in a single unitary element. The rear sight element may be pivotally connected to the rear base. The rear sight element may be configured to pivot one quarter turn between the lowered condition and the elevated condition. The first rear posts may extend to a first height above the rear base. The second rear posts may extend to a second height above the rear base. The second height may be greater than the first height. For example, the first height may be in a range of 0.201 to 0.221 inches. For example, the second height may be in a range of 0.482 to 0.502 inches.

According to an embodiment, a rear base may comprise a width less than 0.75 inches.

According to an embodiment, first rear posts may be adapted to extend to a height in a range of 0.201 to 0.221 inches above a top surface of a pistol slide when the rear sight element is mounted on a pistol slide and placed in the lowered condition.

According to an embodiment, second rear posts may be adapted to extend to a height in a range of 0.482 to 0.502 inches above a top surface of a pistol slide when the rear sight element is mounted on the pistol slide and placed in the elevated condition.

According to an embodiment, a rear sight element may comprise a ring, a buckhorn, a blade-shaped post, a diamond-shaped post, combinations thereof, and/or the like.

According to an embodiment, a rear base may include rear base posts. The rear base posts may have upper base ends. A rear sight element may have upper element ends. The upper base ends may be registered with the upper element ends when the rear sight element is in a lowered condition.

According to an embodiment, a firearm sight assembly may include a front sight element. The front sight element may have a front base. The front sight element may have a single post element. The single post element may be connected to the front base. The single post element may be movable between a lowered condition and an elevated condition. The single post element may extend to a first front post height registered with first rear posts when the single post element and a rear sight element are in a lowered condition. The single post element may extend to a second front post height registered with second rear posts when the single post element and the rear sight element are in an elevated condition. The second front post height may be greater than the first front post height. For example, the first front post height may be in a range of 0.194 to 0.211 inches. For example, the second front post height may be in a range of 0.474 to 0.492 inches.

According to an embodiment, a front base may comprise a width of 0.152 inches.

According to an embodiment, a single post element may be adapted to extend to a height of 0.194 inches above a top surface of a pistol slide when the single post element is mounted on the pistol slide and placed in the lowered condition.

According to an embodiment, a single post element may be adapted to extend to a height of 0.474 inches above a top surface of a pistol slide when the single post element is mounted on the pistol slide and placed in the elevated condition.

According to an embodiment, a single post element may comprise a ring, a buckhorn, a blade-shaped post, a diamond-shaped post, a bead, combinations thereof, and/or the like.

According to an embodiment, a firearm sight assembly may include a pistol slide. The pistol slide may be connected to a rear base. The pistol slide may be connected to an optical sight. The optical sight may be connected to the pistol slide directly. The pistol slide may be connected to a front base.

FIG. 1 illustrates an example firearm sight assembly installed on an example pistol slide 40 of an example firearm according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition (as shown) and an elevated condition. The firearm sight assembly may comprise a front base 20. The firearm sight assembly may comprise a single post element 22 connected to the front base 20. The single post element 22 may be movable with respect to the front base 20 between a lowered condition (as shown) and an elevated condition. The firearm sight assembly may be installed on the pistol slide 40. The firearm may comprise the pistol slide 40 and a pistol frame 44.

Figure 2:
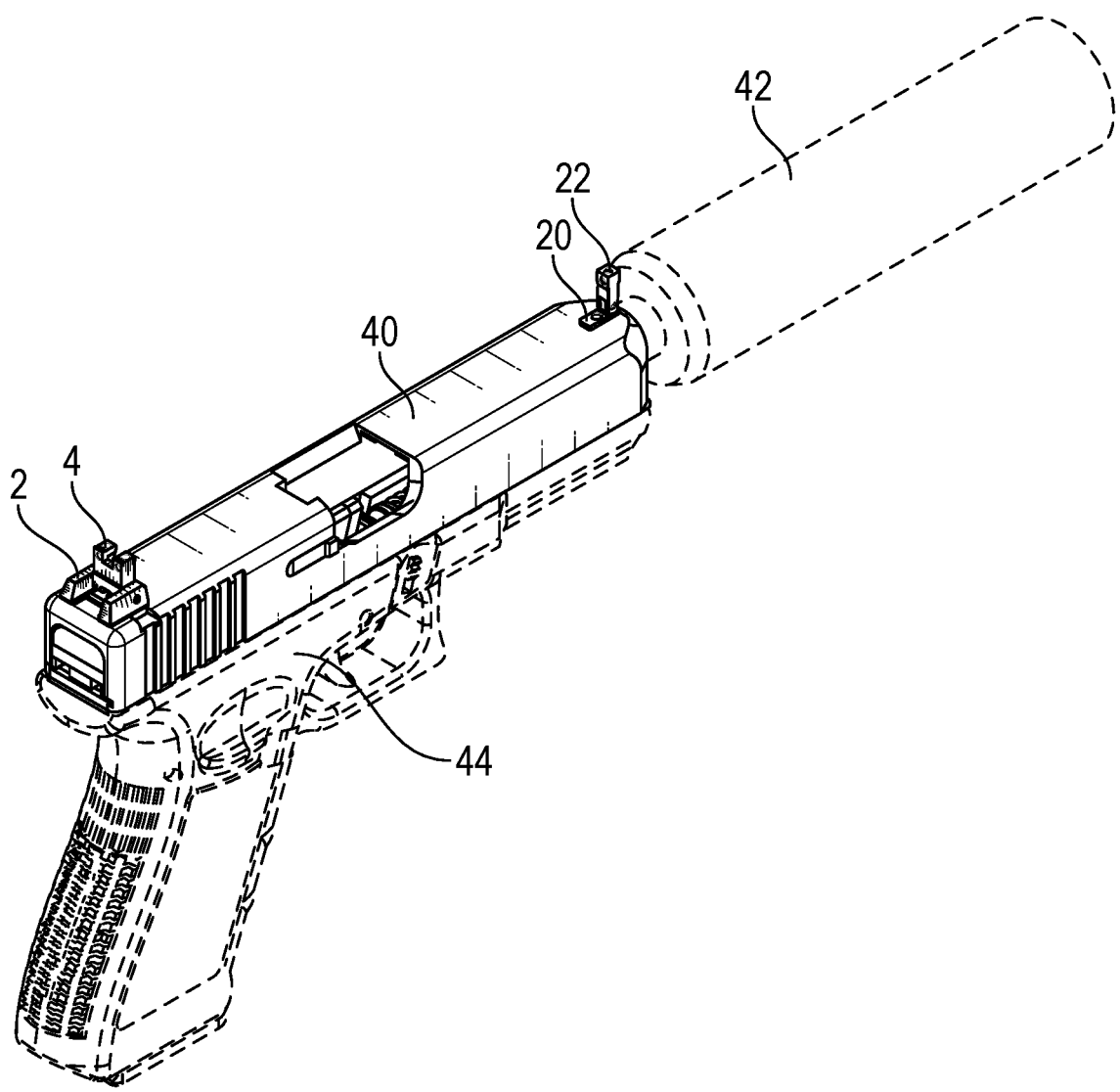
FIG. 2 illustrates an example firearm sight assembly installed on an example pistol slide of an example firearm according to various aspects of an embodiment.

FIG. 2 illustrates an example firearm sight assembly installed on an example pistol slide 40 of an example firearm according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition and an elevated condition (as shown). The firearm sight assembly may comprise a front base 20. The firearm sight assembly may comprise a single post element 22 connected to the front base 20. The single post element 22 may be movable with respect to the front base 20 between a lowered condition and an elevated condition (as shown). The firearm sight assembly may be installed on the pistol slide 40. The firearm may comprise the pistol slide 40 and a pistol frame 44. The firearm may comprise a suppressor 42. The suppressor 42 may be removable.

According to an embodiment, a firearm sight assembly may include an intervening optical sight between a rear sight element and a front sight element. The firearm sight assembly may include an optical sight behind the rear sight element and the front sight element. The optical sight may have an aiming point registered with the rear sight element when the rear sight element is in an elevated condition. The optical sight may be a non-magnifying reflex sight. The optical sight may have a transparent optical element adapted to reflect the aiming point to a user. The optical sight may be adapted to transmit the aiming point to the user.

Figure 3:
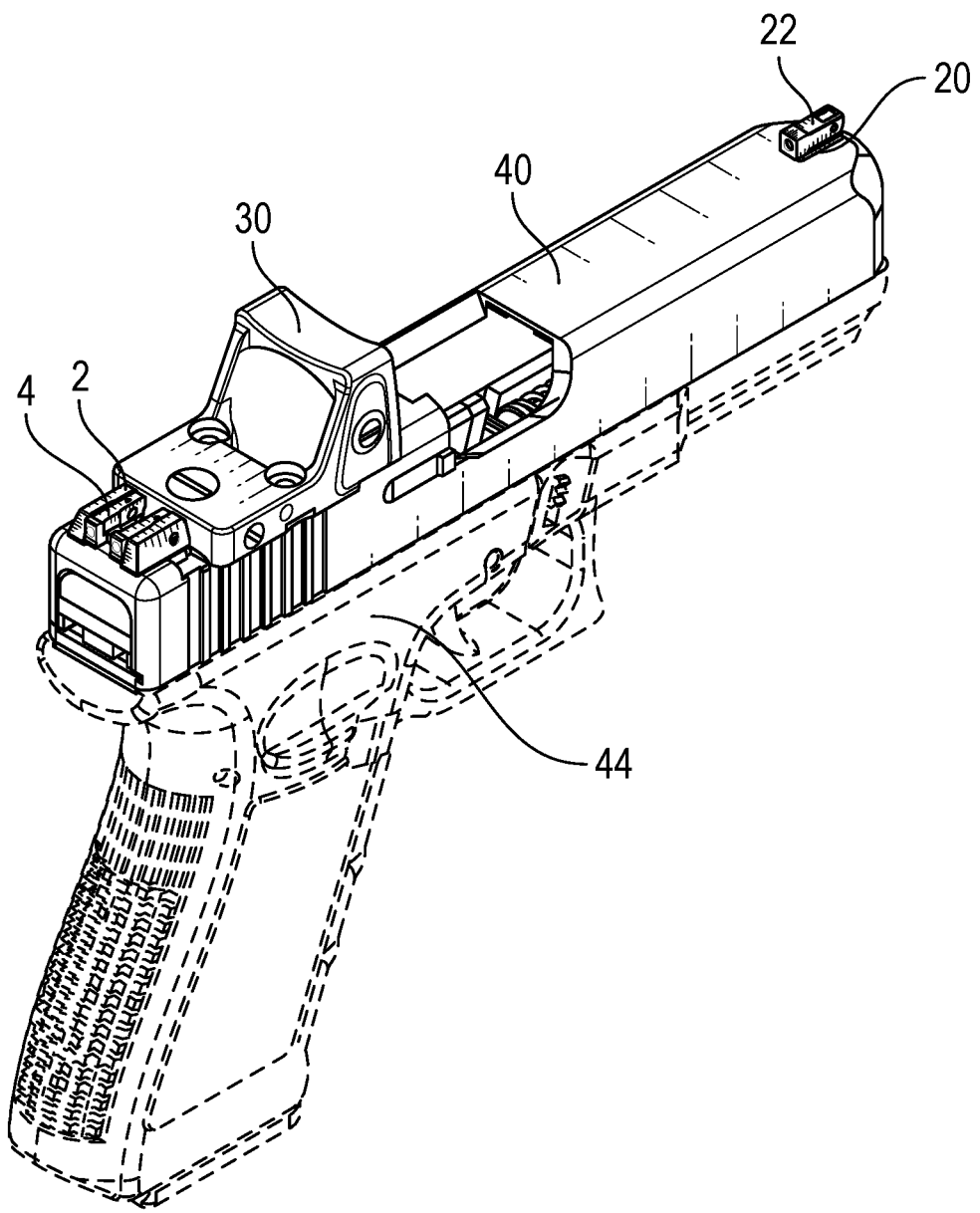
FIG. 3 illustrates an example firearm sight assembly installed on an example pistol slide of an example firearm according to various aspects of an embodiment.

FIG. 3 illustrates an example firearm sight assembly installed on an example pistol slide 40 of an example firearm according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition (as shown) and an elevated condition. The firearm sight assembly may comprise a front sight element. The front sight element may comprise a front base 20. The front sight element may comprise a single post element 22 connected to the front base 20. The single post element 22 may be movable with respect to the front base 20 between a lowered condition (as shown) and an elevated condition. The firearm sight assembly may comprise an intervening optical sight 30 between the rear sight element 4 and the single post element 22. The firearm sight assembly may be installed on the pistol slide 40. The firearm may comprise the pistol slide 40 and a pistol frame 44.

Figure 4:
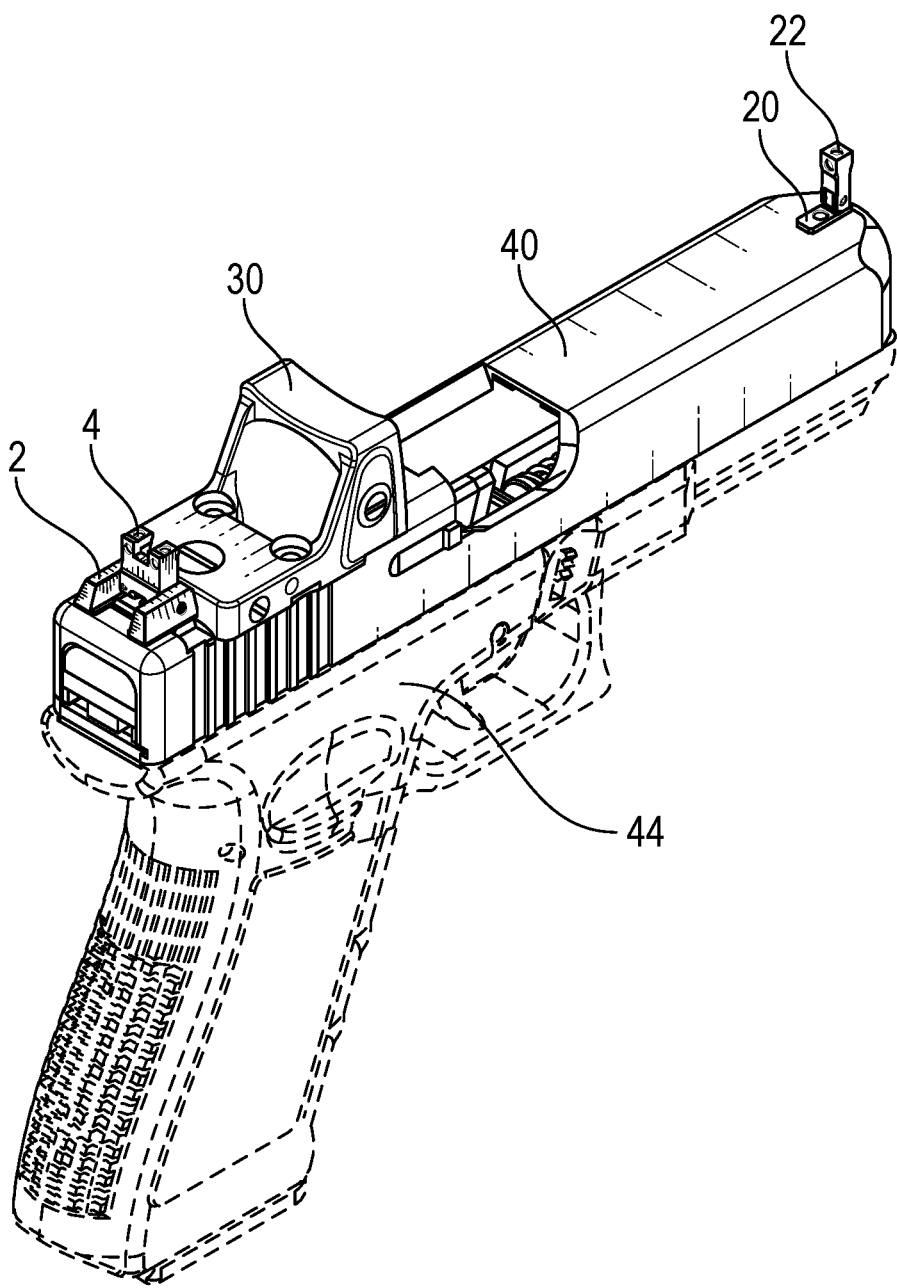
FIG. 4 illustrates an example firearm sight assembly installed on an example pistol slide of an example firearm according to various aspects of an embodiment.

FIG. 4 illustrates an example firearm sight assembly installed on an example pistol slide 40 of an example firearm according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition and an elevated condition (as shown). The firearm sight assembly may comprise a front sight element. The front sight element may comprise a front base 20. The front sight element may comprise a single post element 22 connected to the front base 20. The single post element 22 may be movable with respect to the front base 20 between a lowered condition and an elevated condition (as shown). The firearm sight assembly may comprise an intervening optical sight 30 between the rear sight element 4 and the single post element 22. The firearm sight assembly may be installed on the pistol slide 40. The firearm may comprise the pistol slide 40 and a pistol frame 44.

According to an embodiment, at least one sight point may be included in a firearm sight assembly to assist a user in sight acquisition. The at least one sight point may comprise at a luminous material like photoluminescent, fiber optic(s), Tritium, combinations thereof, and/or the like.

Figure 5A:
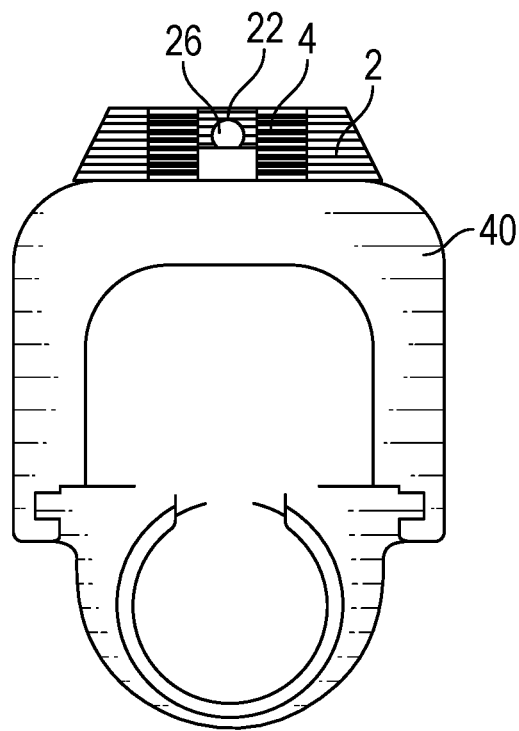
FIGS. 5A and 5B illustrate a rear view of an example firearm sight assembly installed on an example pistol slide according to various aspects of an embodiment.
Figure 5B:
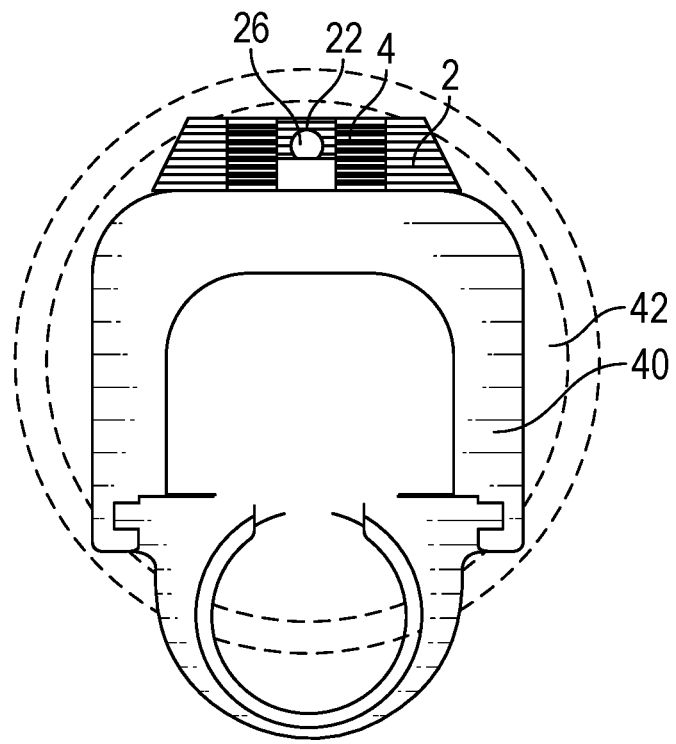

FIGS. 5A and 5B illustrate a rear view of an example firearm sight assembly installed on an example pistol slide 40 according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition (as shown) and an elevated condition. The rear sight element 4 may comprise rearward facing serrations in the lowered condition (as shown). The firearm sight assembly may comprise a front base. The firearm sight assembly may comprise a single post element 22 connected to the front base. The single post element 22 may be movable with respect to the front base between a lowered condition (as shown) and an elevated condition. The single post element 22 may comprise rearward facing serrations in the lowered condition (as shown). The single post element 22 may comprise a front sight point 26. The firearm sight assembly may be installed on the pistol slide 40. The firearm may comprise a suppressor 42. The suppressor 42 may be removable. When installed on the firearm, the suppressor 42 may block a sight picture of the single post element 22 and the rear sight element 4 when in the lowered condition as shown in FIG. 5B.

Figure 6A:
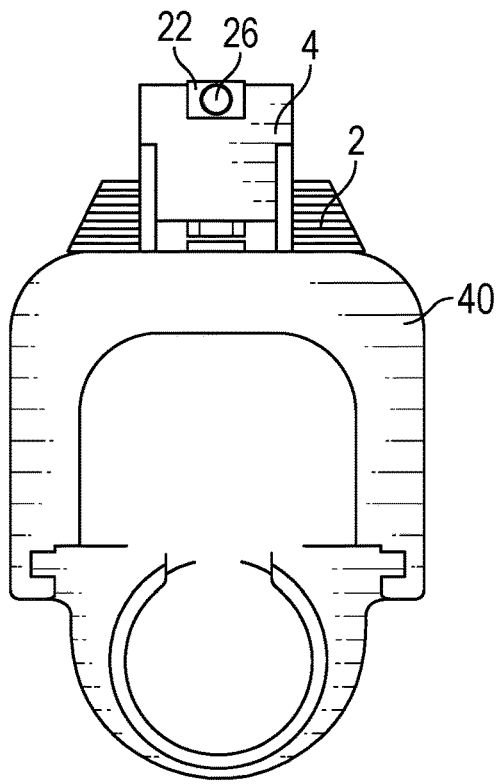
FIGS. 6A and 6B illustrate a rear view of an example firearm sight assembly installed on an example pistol slide according to various aspects of an embodiment.
Figure 6B:
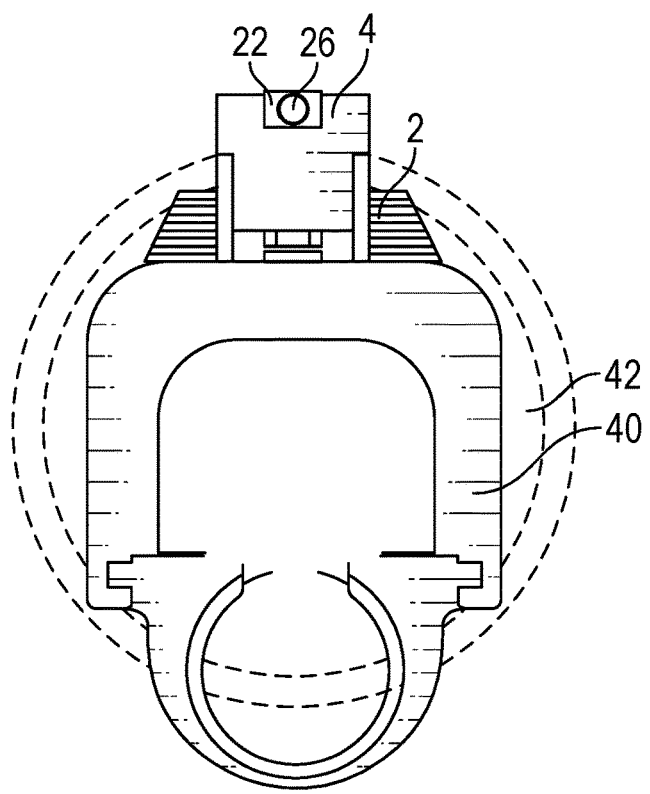

FIGS. 6A and 6B illustrate a rear view of an example firearm sight assembly installed on an example pistol slide 40 according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition and an elevated condition (as shown). The firearm sight assembly may comprise a front base. The firearm sight assembly may comprise a single post element 22 connected to the front base. The single post element 22 may be movable with respect to the front base 20 between a lowered condition and an elevated condition (as shown). The single post element 22 may comprise a front sight point 26. The firearm sight assembly may be installed on the pistol slide 40. The firearm may comprise a suppressor 42. The suppressor 42 may be removable. When the single post element 22 and the rear sight element 4 are in the elevated condition, and the suppressor 42 is installed on the firearm, a sight picture may be attained as shown in FIG. 6B.

According to an embodiment, a firearm sight assembly may comprise a rear base. The firearm sight assembly may comprise a rear sight element. The rear sight element may be movable with respect to the rear base between a lowered condition and an elevated condition. The rear sight element may have a pair of upwardly projecting rear posts. The upwardly projecting rear posts may define a notch therebetween when the upwardly projecting rear posts are in the elevated condition. The rear posts may project to a first level when in the elevated condition. The rear sight element may have a pair of upper surfaces. The pair of upper surfaces may project to a second level when in the lowered condition. The second level may be below the first level. The rear sight element may be pivotally connected to the rear base. The rear sight element may be configured to pivot one quarter turn between the lowered condition and the elevated condition. The rear base may include rear base posts having upper base ends. The upper base ends may be registered with the upper surfaces when the rear sight element is in the lowered condition.

According to an embodiment, a firearm sight assembly may include a front sight element. The front sight element may have a front base. The front sight element may have a single post element connected to the front base. The single post element may be movable between a lowered condition and an elevated condition. The single post element may extend to a first front post height registered with rear posts of a rear sight element when the single post element and the rear sight element are in the elevated condition. The single post element may extend to a second front post height registered with upper surfaces of the rear sight element when the single post element and the rear sight element are in the lowered condition.

According to an embodiment, a firearm sight assembly may comprise an optical sight. The optical sight may be forward of a rear sight element. The optical sight may have a viewing window defining a field of view. The viewing window may have a lower edge at a third level. The third level may be in a range of 0.205-0.344 inches above a top surface of a pistol slide. The viewing window may have an upper edge at a fourth level. The fourth level may be in a range of 0.75 to 1.3 inches above a top surface of a pistol slide. The third level may be below a first level, such that rear posts are viewed in registration with the viewing window when in an elevated condition. The optical sight may be between the rear sight element and a front sight element. The optical sight may be behind the rear sight element and the front sight element. The optical sight may have an aiming point registered with the rear sight element when in the elevated condition. The optical sight may be a non-magnifying reflex sight. The optical sight may have a transparent optical element adapted to reflect the aiming point to a user. The third level may be above a second level such that the rear sight element does not obscure the viewing window when in a lowered condition. The third level may be below the second level such that upper surfaces are in view of a portion of the viewing window when in the lowered condition. For example, the upper surfaces may cover less than 33⅓ percent of the viewing window. In this example, the upper surfaces may be considered as a lower ⅓ co-witness with the aiming point.

Figure 7A:
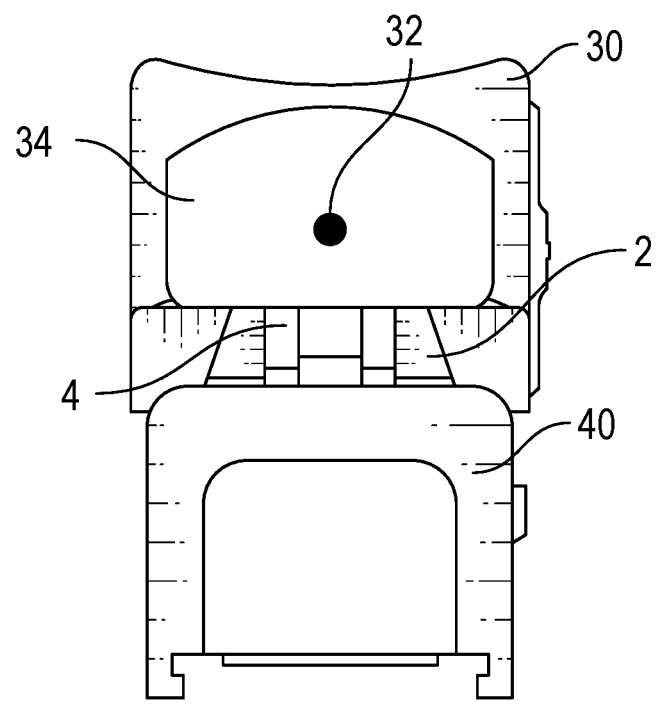
FIG. 7A illustrates a rear view of an example firearm sight assembly installed on an example pistol slide according to various aspects of an embodiment.

FIG. 7A illustrates a rear view of an example firearm sight assembly installed on an example pistol slide 40 according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition (as shown) and an elevated condition. The firearm sight assembly may comprise a front base. The firearm sight assembly may comprise a single post element connected to the front base. The single post element may be movable with respect to the front base between a lowered condition and an elevated condition. The firearm sight assembly may comprise an optical sight 30. The optical sight 30 may comprise an aiming point 32. The optical sight 30 may comprise a viewing window 34 defining a field of view. The optical sight 30 may block the view of the single post element when in the lowered condition (as shown). The firearm sight assembly may be installed on the pistol slide 40.

Figure 7B:
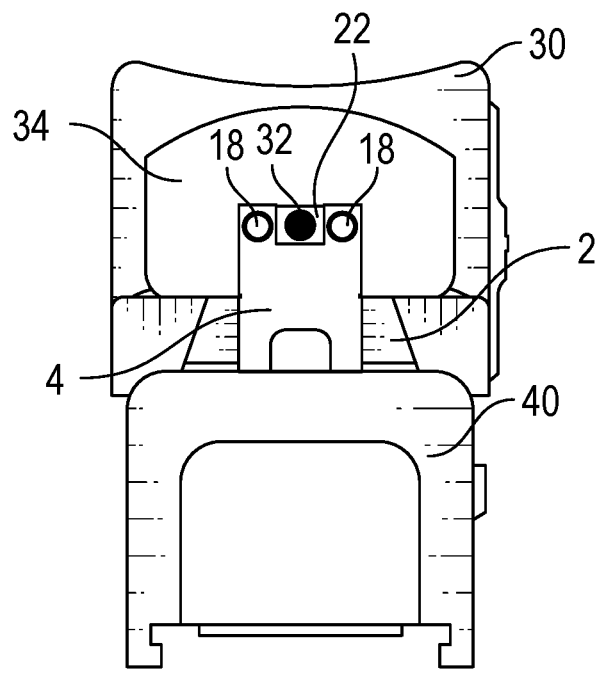
FIG. 7B illustrates a rear view of an example firearm sight assembly installed on an example pistol slide according to various aspects of an embodiment.

FIG. 7B illustrates a rear view of an example firearm sight assembly installed on an example pistol slide 40 according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition and an elevated condition (as shown). The rear sight element 4 may comprise a pair of rear sight points 18. The firearm sight assembly may comprise a front base. The firearm sight assembly may comprise a single post element 22 connected to the front base. The single post element 22 may be movable with respect to the front base between a lowered condition and an elevated condition (as shown). The firearm sight assembly may comprise an optical sight 30. The optical sight 30 may comprise an aiming point 32. The aiming point may overlap at least part of the single post element 22 when in the elevated condition (as shown). The optical sight 30 may comprise a viewing window 34 defining a field of view. The firearm sight assembly may be installed on the pistol slide 40.

According to an embodiment, a rear base may include a dovetail. A rear base may include at least one leg. A rear base may include at least one flange. A rear base may include a threaded mounting boss.

According to an embodiment, a front base may include at least one leg. A front base may include a dovetail. A front base may include at least one flange. A front base may include a threaded mounting boss.

Figure 8:
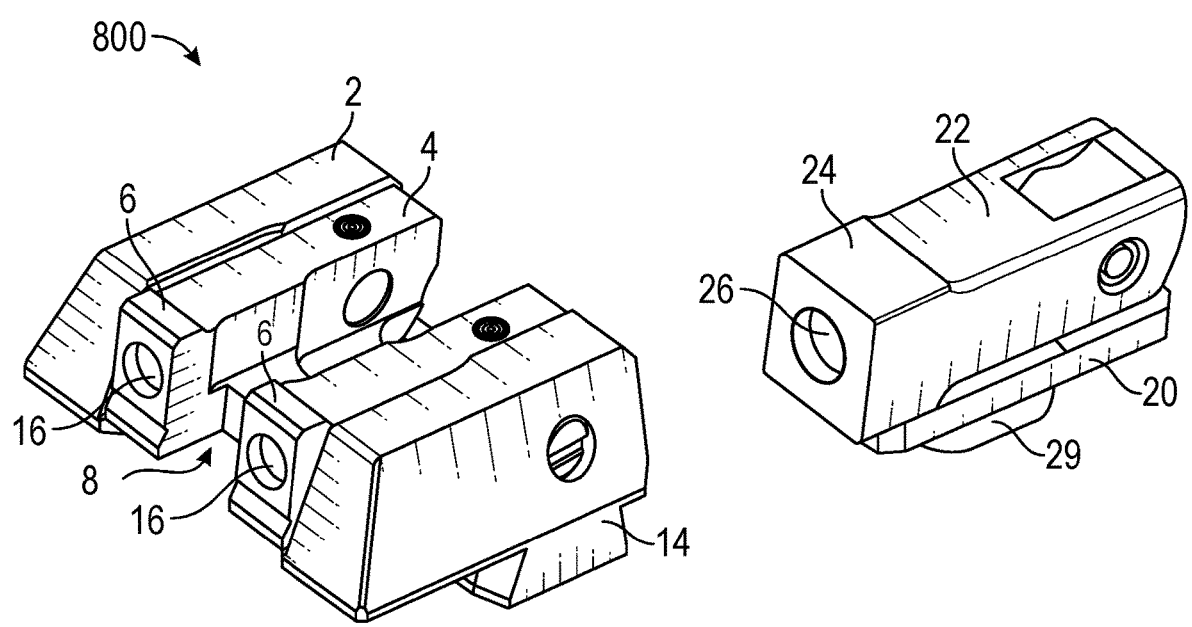
FIG. 8 illustrates an example firearm sight assembly in a lowered condition according to an aspect of an embodiment.

FIG. 8 illustrates an example firearm sight assembly 800 in a lowered condition according to an aspect of an embodiment. The firearm sight assembly 800 may comprise a rear base 2. The firearm sight assembly 800 may comprise a rear sight element 4 connected to the rear base 2. The rear sight element 4 may be movable with respect to the rear base 2 between a lowered condition (as shown) and an elevated condition. The rear base 2 may comprise a dovetail 14. The rear sight element 4 may have a pair of upper surfaces 6. The pair of upper surfaces 6 may define at least part of a notch 8 therebetween when in the lowered condition (as shown). The rear sight element 4 may comprise a first pair of rear sight points 16. The firearm sight assembly 800 may comprise a front base 20. The firearm sight assembly 800 may comprise a single post element 22 connected to the front base 20. The single post element 22 may be movable with respect to the front base 20 between a lowered condition (as shown) and an elevated condition. The front base 20 may comprise at least one leg 29. The single post element 22 may comprise an upper post surface 24. The single post element 22 may comprise a first front sight point 26.

Figure 9:
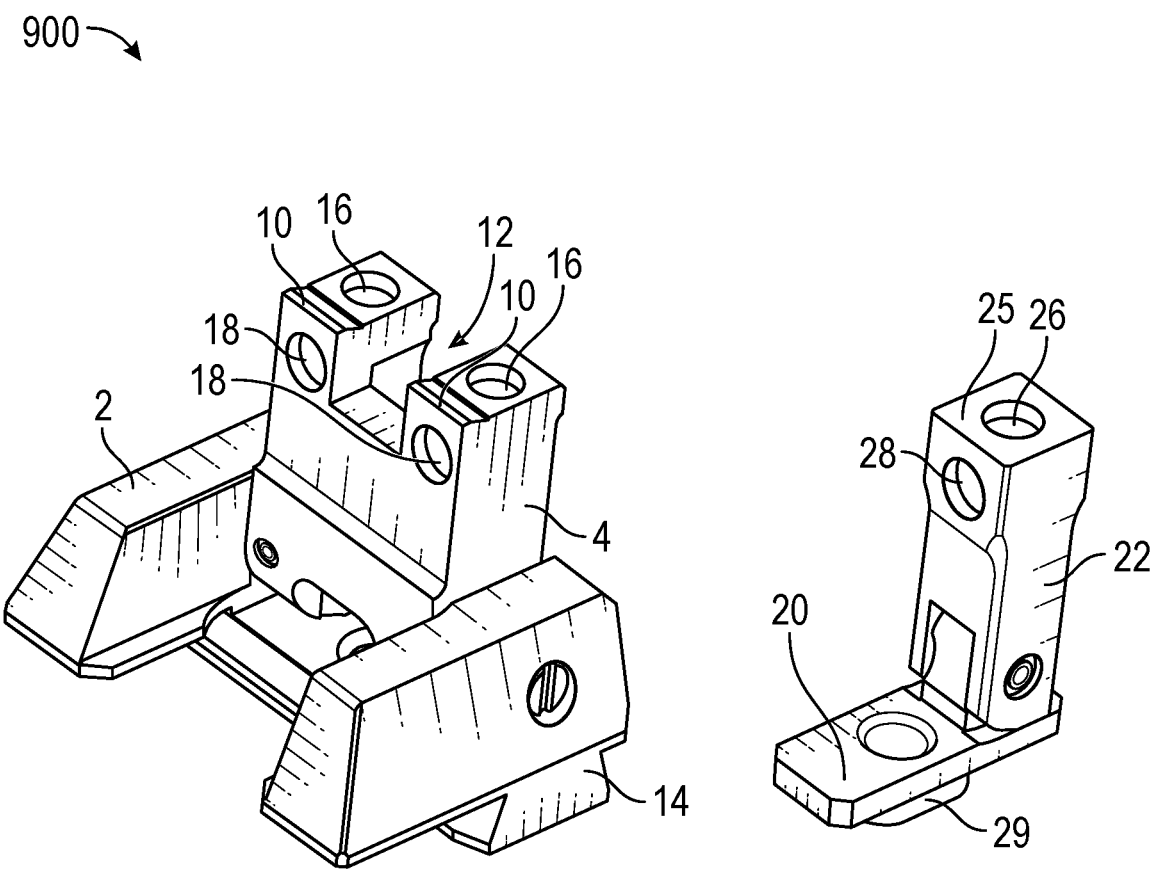
FIG. 9 illustrates an example firearm sight assembly in an elevated condition according to an aspect of an embodiment.

FIG. 9 illustrates an example firearm sight assembly 900 in an elevated condition according to an aspect of an embodiment. The firearm sight assembly 900 may comprise a rear base 2. The firearm sight assembly 900 may comprise a rear sight element 4 connected to the rear base 2. The rear sight element 4 may be movable with respect to the rear base 2 between a lowered condition and an elevated condition (as shown). The rear base 2 may comprise a dovetail 14. The rear sight element 4 may have a pair of upwardly projecting rear posts. The upwardly projecting rear posts may have upper base ends 10. The upwardly projecting rear posts may define a notch 12 therebetween when the upwardly projecting rear posts are in the elevated condition (as shown). The rear sight element 4 may comprise a first pair of rear sight points 16. The first pair of rear sight points 16 may be employed when the rear sight element 4 is in a lowered condition. The rear sight element 4 may comprise a second pair of rear sight points 18. The second pair of rear sight points 18 may be employed when the rear sight element 4 is in an elevated condition (as shown). The firearm sight assembly 900 may comprise a front base 20. The firearm sight assembly 900 may comprise a single post element 22 connected to the front base 20. The single post element 22 may be movable with respect to the front base 20 between a lowered condition and an elevated condition (as shown). The front base 20 may comprise at least one leg 29. The single post element 22 may comprise an upper post end 25. The single post element 22 may comprise a first front sight point 26. The first front sight point 26 may be employed when the single post element 22 is in a lowered condition. The single post element 22 may comprise a second front sight point 28. The second front sight point 28 may be employed when the single post element 22 is in an elevated condition (as shown).

According to an embodiment, a sight picture acquired by a user of a firearm sight assembly may include a first pair of rear sight points (e.g. 16) and a first front sight point (e.g. 26) when a rear sight element (e.g. 4) and a single post element (e.g. 22) are in a lowered condition. The sight picture acquired by the user may include a second pair of rear sight points (e.g. 18) and a second front sight point (e.g. 28) when the rear sight element (e.g. 4) and the single post element (e.g. 22) are in an elevated condition. When used with an optical sight (e.g. 30), the firearm sight assembly may have no sight picture in the lowered condition. When used with an optical sight (e.g. 30), the firearm sight assembly may be void of the first pair of rear sight points (e.g. 16) and the first front sight point (e.g. 26).

According to an embodiment, a sight picture acquired by a user of a firearm sight assembly may include a rear base (e.g. 2), a rear sight element (e.g. 4), and a single post element (e.g. 22) when the rear sight element (e.g. 4) and the single post element (e.g. 22) are in a lowered condition. The sight picture acquired by the user may include the rear sight element (e.g. 4) and the single post element (e.g. 22) when the rear sight element (e.g. 4) and the single post element (e.g. 22) are in an elevated condition.

Figure 10A:
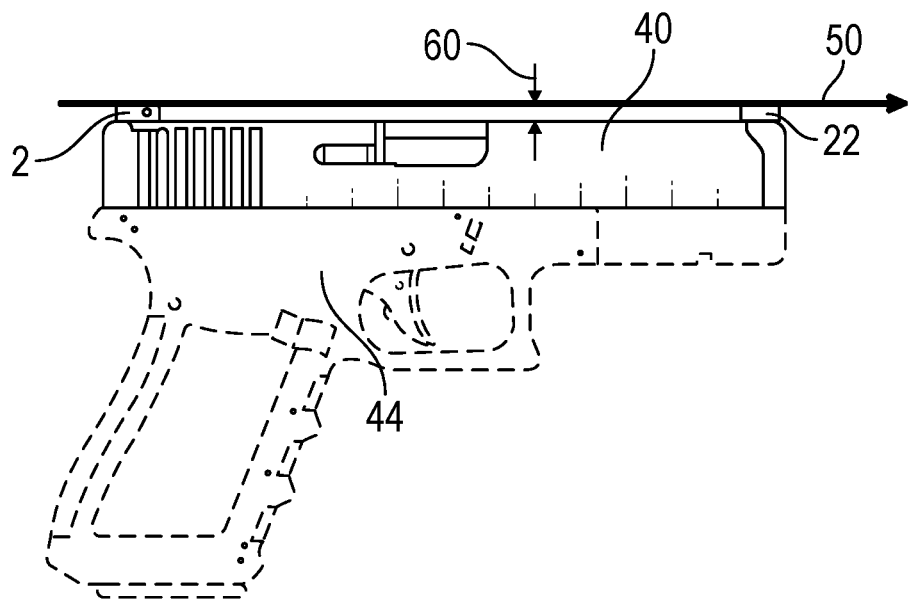
FIG. 10A illustrates an example sighting line of a firearm sight assembly installed on an example pistol slide of an example firearm according to various aspects of an embodiment.

FIG. 10A illustrates an example sighting line 50 of a firearm sight assembly installed on an example pistol slide 40 of an example firearm according to various aspects of an embodiment. The firearm sight assembly may comprise a rear base 2. The firearm sight assembly may comprise a rear sight element connected to the rear base 2. The rear sight element may be movable with respect to the rear base 2 between a lowered condition (as shown) and an elevated condition. The firearm sight assembly may comprise a front base. The firearm sight assembly may comprise a single post element 22 connected to the front base. The single post element 22 may be movable with respect to the front base between a lowered condition (as shown) and an elevated condition. The firearm sight assembly may be installed on the pistol slide 40. The firearm may comprise the pistol slide 40 and a pistol frame 44. The sighting line 50 of a user employing the rear sight element and the single post element may comprise a height 60 above the slide 40.

Figure 10B:
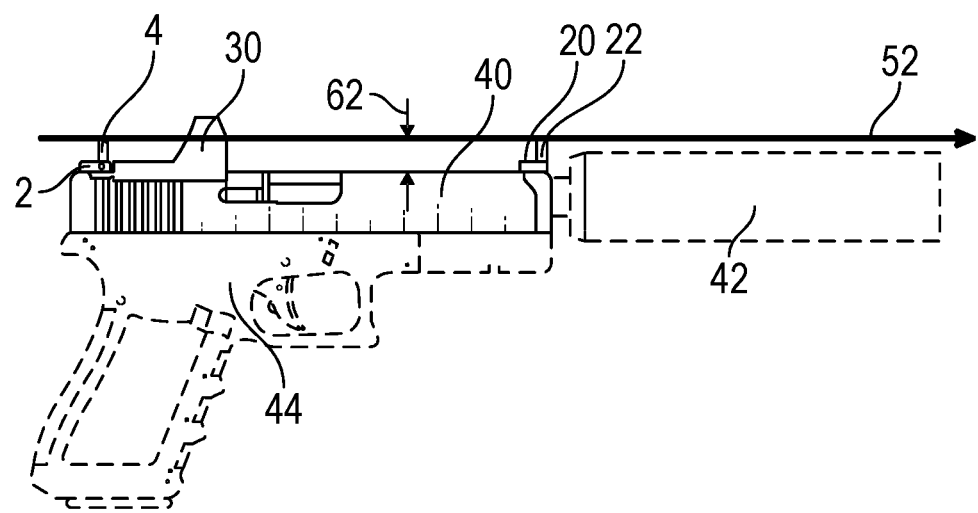
FIG. 10B illustrates an example sighting line of a firearm sight assembly installed on an example pistol slide of an example firearm according to various aspects of an embodiment.

FIG. 10B illustrates an example sighting line 52 of a firearm sight assembly installed on an example pistol slide 40 of an example firearm according to various aspects of an embodiment. The firearm sight assembly may comprise a rear base 2. The firearm sight assembly may comprise a rear sight element 4 connected to the rear base 2. The rear sight element 4 may be movable with respect to the rear base 2 between a lowered condition and an elevated condition (as shown). The firearm sight assembly may comprise a front sight element. The front sight element may comprise a front base 20. The front sight element may comprise a single post element 22 connected to the front base 20. The single post element 22 may be movable with respect to the front base 20 between a lowered condition and an elevated condition (as shown). The firearm sight assembly may comprise an intervening optical sight 30 between the rear sight element 4 and the single post element 22. The firearm sight assembly may be installed on the pistol slide 40. The firearm may comprise the pistol slide 40 and a pistol frame 44. The firearm may comprise a suppressor 42. The suppressor 42 may be removable. The sighting line 52 of a user employing the rear sight element 4 and the single post element 22 may comprise a height 62 above the slide 40.

Figure 11A:
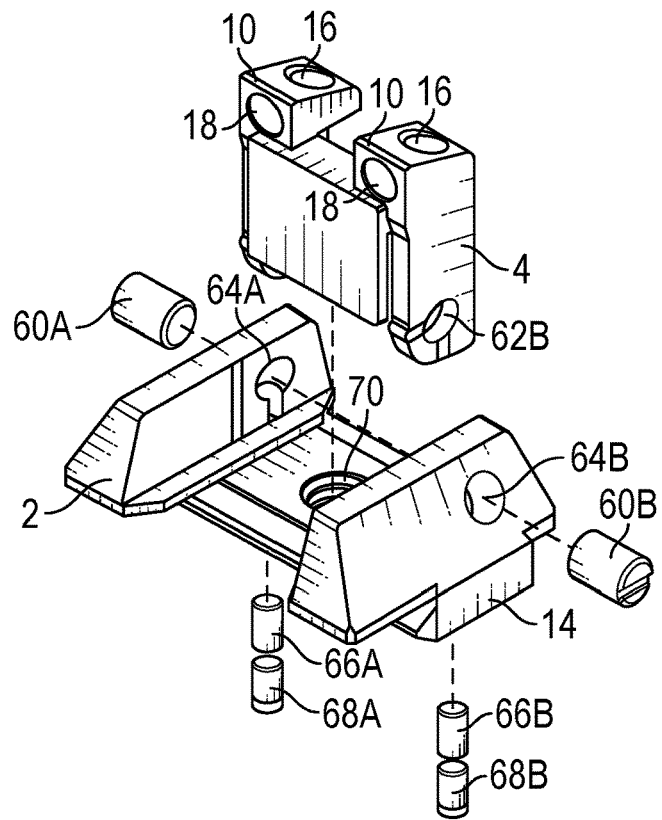
FIGS. 11A and 11B illustrate exploded views of an example firearm sight assembly according to an aspect of an embodiment.
Figure 11B:
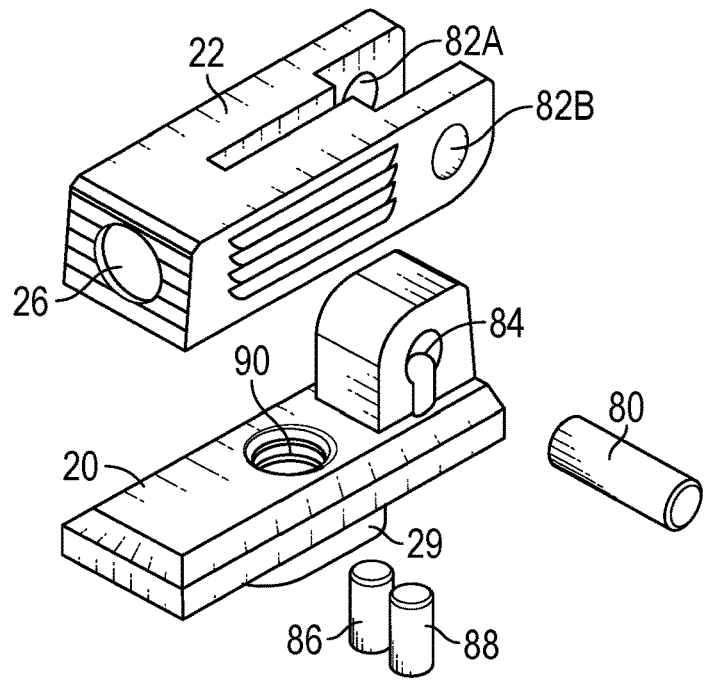

FIGS. 11A and 11B illustrate exploded views of an example firearm sight assembly according to an aspect of an embodiment. The firearm sight assembly may comprise a rear base 2. The firearm sight assembly may comprise a rear sight element 4. The rear sight element 4 may be adapted to connect to the rear base 2 through employment of at least one pivot pin (60A and 60B). At least one pivot pin port (62B, 64A, and 64B) may be adapted to receive the at least one pivot pin (60A and 60B). Once connected to the rear base 2, the rear sight element 4 may be movable with respect to the rear base 2 between a lowered condition and an elevated condition. The lowered condition and/or the elevated condition may be maintained through employment of at least one detent roller (66A and 66B). The at least one detent roller (66A and 66B) may be retained through employment of at least one detent retainer plugs (68A and 68B). The rear base 2 may comprise a dovetail 14. The rear base 2 may comprise at least one base retaining port 70. The at least one base retaining port 70 may be threaded. The rear sight element 4 may have a pair of upwardly projecting rear posts 10. The rear sight element 4 may comprise a first pair of rear sight points 16. The rear sight element 4 may comprise a second pair of rear sight points 18. The firearm sight assembly may comprise a front base 20. The firearm sight assembly may comprise a single post element 22. The single post element 22 may be adapted to connect to the front base 20 through employment of at least one pivot pin 80. At least one pivot pin port (82A, 82B, and 84) may be adapted to receive the at least one pivot pin 80. Once connected to the front base 20, the single post element 22 may be movable with respect to the front base 20 between a lowered condition and an elevated condition. The lowered condition and/or the elevated condition may be maintained through employment of at least one detent roller (86 and 88). The front base 20 may comprise at least one leg 29. The front base 20 may comprise at least one base retaining port 90. The at least one base retaining port 90 may be threaded. The single post element 22 may comprise a first front sight point 26.

Various embodiments have been presented. Each of these embodiments may of course include features from other embodiments presented, and embodiments not specifically, described may include various features described herein.

A person of ordinary skill in the art will appreciate that components shown in and described with respect to the figures are provided by way of example only. Numerous other configurations are possible. Accordingly, embodiments of the present disclosure should not be construed as being limited to any particular configuration. It will be appreciated that while the disclosure may in certain instances describe a single example embodiment, there may be other configurations, shapes, and orientations of assemblies and components without departing from example embodiments of the present disclosure. A person of ordinary skill in the art will recognize the applicability of embodiments of the present disclosure to various pistols, pistol slides, optical sights, and combinations thereof known in the art. A person of ordinary skill in the art may recognize that embodiments of the present disclosure may comprise fabricated, milled, printed, extruded, molded, combinations thereof, and/or the like parts comprising one material or a plurality of materials. A person of ordinary skill in the art will appreciate that components and elements shown in and described with respect to FIGS. 1-11B are provided by way of example only. Numerous other pistols, pistol slides, optical sights, and various sight element configurations are possible. Accordingly, embodiments of the present disclosure should not be construed as being limited to any particular pistol, pistol slide, or optical sight. Additionally, it is to be recognized that, while the present disclosure has been described above in terms of various embodiments, it is not limited thereto. Various features, aspects, and/or components of the above described present disclosure may be used individually or jointly. Accordingly, the claims set forth below should be construed in view of the full breadth of the embodiments as disclosed herein.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, an assembly described as having three optional features may be embodied in seven different ways, namely with just one of the three possible features, with any two of the three possible features or with all three of the three possible features.

Further, the purpose of the Abstract of the Disclosure is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

We claim:

1. A firearm sight assembly comprising:
   a rear base;
   a rear sight element movable with respect to the rear base between a lowered condition and an elevated condition;
   the rear sight element having a first pair of upwardly projecting first rear posts defining a first notch therebetween when in the lowered condition,
   the rear sight element having a second pair of upwardly projecting second rear posts defining a second notch therebetween when in the elevated condition;
   the first rear posts and second rear posts being in fixed relation to each other such that they move in concert when the rear sight element is moved with respect to the rear base;
   the second rear posts being the most upwardly projecting portion of the rear sight element when in the elevated condition; and the first rear posts extending to a first height above the rear base, and the second rear posts extending to a second height above the rear base, the second height greater than the first height.

2. The firearm sight assembly according to claim 1, wherein the first notch and the second notch are defined in a single unitary element.

3. The firearm sight assembly according to claim 1, wherein the rear sight element is pivotally connected to the rear base.

4. The firearm sight assembly according to claim 3, wherein the rear sight element is configured to pivot one quarter turn between the lowered condition and the elevated condition.

5. The firearm sight assembly according to claim 1, wherein the rear base includes a dovetail.

6. The firearm sight assembly according to claim 1 wherein the first rear posts and second rear posts are formed on a single element.

7. The firearm sight assembly according to claim 1 wherein the rear sight element is a unitary body.

8. The firearm sight assembly according to claim 1 wherein the rear sight element has a first side and a second side, and where the first notch is defined in the first side and the second notch is defined in the second side.

9. The firearm sight assembly according to claim 8 wherein the first side is perpendicular to the second side.

10. The firearm sight assembly according to claim 1 wherein the first rear posts extend perpendicularly to the second rear posts.

11. A firearm sight assembly comprising:
a rear base;
a rear sight element movable with respect to the rear base between a lowered condition and an elevated condition;
the rear sight element having a first pair of upwardly projecting first rear posts defining a first notch therebetween when in the lowered condition;
the rear sight element having a second pair of upwardly projecting second rear posts defining a second notch therebetween when in the elevated condition;
the first rear posts extending to a first height above the rear base, and the second rear posts extending to a second height above the rear base, the second height greater than the first height; and
wherein the rear base includes rear base posts having upper base ends, the rear sight element having upper element ends, and the upper base ends are aligned with the upper element ends when the rear sight element is in the lowered condition.

12. A firearm sight assembly comprising:
a rear base;
a rear sight element movable with respect to the rear base between a lowered condition and an elevated condition;
the rear sight element having a first pair of upwardly projecting first rear posts defining a first notch therebetween when in the lowered condition;
the rear sight element having a second pair of upwardly projecting second rear posts defining a second notch therebetween when in the elevated condition; and
the first rear posts extending to a first height above the rear base, and the second rear posts extending to a second height above the rear base, the second height greater than the first height; and
including a front sight element having a front base, and a single post element connected to the front base and movable between a lowered condition and an elevated condition, the single post element extending to a first front post height aligned with the first rear posts when the single post element and the rear sight element are in the lowered condition and extending to a second front post height aligned with the second rear posts when the single post element and the rear sight element are in the elevated condition.

13. The firearm sight assembly according to claim 12, including an intervening optical sight between the rear sight element and the front sight element.

14. The firearm sight assembly according to claim 13, wherein the optical sight has an aiming point aligned with the rear sight element when in the elevated condition.

15. The firearm sight assembly according to claim 14, including a pistol slide connected to the rear base, to the optical sight, and to the front base.

16. The firearm sight assembly according to claim 14, wherein the optical sight is a non-magnifying reflex sight having a transparent optical element adapted to reflect the aiming point to a user.

17. A firearm sight assembly comprising:
a rear base;
a rear sight element movable with respect to the rear base between a lowered condition and an elevated condition;
the rear sight element having a pair of upwardly projecting rear posts defining a notch therebetween when in the elevated condition;
the rear posts projecting to a first level when in the elevated condition;
the rear sight element having an upper surface projecting to a second level when in the lowered condition, the second level below the first level; and
an optical sight forward of the rear sight element, the optical sight having a viewing window defining a field of view, the viewing window having a lower edge at a third level below the first level such that the rear posts are viewed in registration with the viewing window when in the elevated condition.

18. The firearm sight assembly according to claim 17, wherein the rear sight element is pivotally connected to the rear base.

19. The firearm sight assembly according to claim 18, wherein the rear sight element is configured to pivot one quarter turn between the lowered condition and the elevated condition.

20. The firearm sight assembly according to claim 17, wherein the rear base includes rear base posts having upper base ends aligned with the upper surface when the rear sight element is in the lowered condition.

21. The firearm sight assembly according to claim 17, wherein the third level is above the second level such that the rear sight element does not obscure the viewing window when in the lowered condition.

22. The firearm sight assembly according to claim 17, including a front sight element having a front base, and a single post element connected to the front base and movable between a lowered condition and an elevated condition, and the single post element extending to a first front post height aligned with the rear posts when the single post element and the rear sight element are in the elevated condition and extending to a second front post height aligned with the upper surface of the rear sight element when the single post element and the rear sight element are in the lowered condition.

23. The firearm sight assembly according to claim 22, wherein the optical sight is between the rear sight element and the front sight element.

24. The firearm sight assembly according to claim 17, wherein the optical sight has an aiming point aligned with the rear sight element when in the elevated condition.

25. The firearm sight assembly according to claim 22, including a pistol slide connected to the rear base, to the optical sight, and to the front base.

26. The firearm sight assembly according to claim 17, wherein the optical sight is a non-magnifying reflex sight having a transparent optical element adapted to reflect the aiming point to a user.

27. The firearm sight assembly according to claim 22, wherein the front base includes a leg.

28. The firearm sight assembly according to claim 17, wherein the first level is less than 1.0 inches.

29. The firearm sight assembly according to claim 22, wherein the first front post height is less than 1.0 inches.

* * * * *